United States Patent
Gunji et al.

(12) 
(10) Patent No.: US 7,212,725 B2
(45) Date of Patent: May 1, 2007

(54) RECORDING/REPRODUCING APPARATUS AND PICTURE RECORDING RESERVATION METHOD OF RECORDING/REPRODUCING APPARATUS

(75) Inventors: Masanori Gunji, Fuchu (JP); Hideo Kataoka, Tokyo (JP); Takahisa Yoneyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1071 days.

(21) Appl. No.: 10/155,231

(22) Filed: May 28, 2002

(65) Prior Publication Data

US 2002/0172496 A1 Nov. 21, 2002

Related U.S. Application Data

(63) Continuation of application No. PCT/JP01/08545, filed on Sep. 28, 2001.

(51) Int. Cl.
H04N 5/91 (2006.01)
(52) U.S. Cl. .......................................... 386/46
(58) Field of Classification Search ............... 386/46, 386/83, 1; 725/58
See application file for complete search history.

(56) References Cited

U.S. PATENT DOCUMENTS 6,243,353 B1 * 6/2001 Nozaki et al. ............ 369/275.3
6,597,862 B1 * 7/2003 Saeki et al. ................. 386/125

FOREIGN PATENT DOCUMENTS

| EP | 0 942 416 A2 | 3/1999 |
| EP | 1 107 256 A2 | 6/2001 |
| JP | 05-12753 | 1/1993 |
| JP | 5-234179 | 9/1993 |
| JP | 8-65621 | 3/1996 |
| JP | 11-213627 | 8/1999 |
| JP | 11-355707 | 12/1999 |
| WO | WO 92/22983 | * 12/1992 |

OTHER PUBLICATIONS

European Search Report dated Mar. 14, 2006 for Appln. No. 01972586.0-2223.

* cited by examiner

*Primary Examiner*—Thai Q. Tran
*Assistant Examiner*—Mishawn Dunn
(74) *Attorney, Agent, or Firm*—Pillsbury Winthrop Shaw Pittman, LLP

(57) ABSTRACT

The remaining capacity of a recording medium is calculated when picture recording reservation is made so as to permit the user to easily understand the reservation status and whether the reservation recording is possible or not. An apparatus of this invention can record and reproduce compressed video information on a contained hard disk in a format of the same DVD standard and can record and reproduce compressed video information on a removable DVD. Further, it is possible to specify a disk and make picture recording reservation and a reservation table thereof is stored in a memory. Then, picture recording reservation time information and the remaining capacity of the disk are calculated and whether or not reservation picture recording can be made can be displayed in a list form.

6 Claims, 10 Drawing Sheets

Picture recording reservation input screen 310

| CH | Date | Start | End | Recording destination | Mode | Rate | Tone quality | TS |
|---|---|---|---|---|---|---|---|---|
| BS15 | 4/12 | PM07:30 | PM08:00 | DVD | Manual | 6.0 | DB-S | OFF |
| 12 | 4/14 | PM07:00 | PM10:00 | HDD | SP | 5.0 | DB-S | ON |
| 8 | 4/18 | AM08:00 | AM09:00 | DVD | SP | 5.0 | DB-S | ON |
| 6 | 4/25 | PM08:30 | PM10:00 | DVD | SP | 5.0 | DB-S | ON |
| 3 | 4/29 | PM01:00 | PM04:20 | HDD | LP | 2.4 | DB-S | ON |
| 4 | 4/30 | PM10:00 | PM12:00 | HDD | SP | 5.0 | L-PCM | OFF |
| 10 | 5/1 | AM10:00 | PM01:00 | HDD | SP | 5.0 | DB-S | OFF |

FIG. 2

Picture recording reservation list screen 350

| CH | Date | Start | End | Recording destination | Mode | Rate | Tone quality | TS |
|---|---|---|---|---|---|---|---|---|
| BS15 | 4/12 | PM07:30 | PM08:00 | DVD | Manual | 6.0 | DB-S | OFF |
| 12 | 4/14 | PM07:00 | PM10:00 | HDD | SP | 5.0 | DB-S | ON |
| 8 | 4/18 | AM08:00 | AM09:00 | DVD | SP | 5.0 | DB-S | ON |
| 6 | 4/25 | PM08:30 | PM10:00 | DVD | SP | 5.0 | DB-S | ON |
| 3 | 4/29 | PM01:00 | PM04:20 | HDD | LP | 2.4 | DB-S | ON |
| 4 | 4/30 | PM10:00 | PM12:00 | HDD | SP | 5.0 | L-PCM | OFF |
| 10 | 5/1 | AM10:00 | PM01:00 | HDD | SP | 5.0 | DB-S | OFF |

RECORDING/REPRODUCING APPARATUS AND PICTURE RECORDING RESERVATION METHOD OF RECORDING/REPRODUCING APPARATUS

CROSS-REFERENCE TO RELATED APPLICATIONS

This is a Continuation Application of PCT Application No. PCT/JP01/08545, filed Sep. 28, 2001, which was not published under PCT Article 21(2) in English.

This application is based upon and claims the benefit of priority from the prior Japanese Patent Application No. 2000-301072, filed Sep. 29, 2000, the entire contents of which are incorporated herein by reference.

BACKGROUND OF THE INVENTION

1. Field of the Invention

The present invention relates to a recording/reproducing apparatus which can simultaneously deal with a plurality of recordable/reproducible media such as hard disks or recordable/reproducible DVDs (digital versatile disks) and a picture recording reservation method of this recording/reproducing apparatus.

2. Description of the Related Art

In recent years, optical disk reproducing apparatuses which can reproduce optical disks having data such as video pictures and audio recorded thereon and deal with moving pictures have been developed. As the optical disk reproducing apparatus, for example, laser disk (LD), video compact disk (CD) reproducing apparatuses are provided. The user can appreciate film software and enjoy karaoke and the like by use of the above apparatuses.

In the field of the optical disk and the application technique thereof, a DVD standard is proposed. In the DVD standard, an MPEG2 (Moving Picture Expert Group 2) system which is internationally standardized is used for compression of video signals and an AC3 audio compression system is used for audio.

That is, the DVD standard supports the MPEG2 system for the moving picture compression system according to an MPEG2 system layer and supports the AC3 audio compression system and MPEG audio compression system for the audio compression system. Further, as captions of movies, karaoke and the like, sub-video data having bit map data subjected to run-length compression can be dealt with based on the DVD standard. Further, in the DVD standard, control data (navigation pack) is defined so as to attain special reproduction such as fast forwarding and fast reversing in the reproducing apparatus.

In addition, in the DVD standard, the standards of ISO9660 and micro UDF are supported so that data of the disk can be read out by computers.

Further, as the standards of media themselves, the standard (2.6 GB) of a DVD-RAM is also completed following on the standard of a DVD-ROM which is a medium of the DVD-video and DVD-RAM drives having also been popularized as computer peripheral devices.

At present, the DVD video standard which realizes a system capable of recording/reproducing information on a real-time basis, that is, the standard of an RTR (Real Time Recorder)-DVD is being completed by use of the DVD-RAM and the test operation is scheduled to be completed in the near future.

The standard is considered based on the standard of the DVD-ROM which is now sold. Further, a file system corresponding to the RTR-DVD is also now standardized.

On the other hand, a system which records and reproduces broadcast signals by utilizing a hard disk device (hard disk drive: HDD) contained in the recording/reproducing apparatus is also considered. In the hard disk device, data of 100 Gbytes or more can be recorded.

When the above hard disk device and DVD system are independently considered, both of them have advantages and disadvantages.

In the case of the hard disk device, it is contained in the recording/reproducing apparatus in the normal service condition and cannot be taken out. Therefore, it is impossible to store data limitlessly. The remaining amount of the recording area will become insufficient in the future. Further, it is impossible for the user to easily take the hard disk device out of the recording/reproducing apparatus. Therefore, it is impossible to take out the hard disk and reproduce data recorded on the hard disk by use of another apparatus.

On the other hand, in the case of the recordable/reproducible DVD, the storage capacity is small in comparison with the hard disk. It is impossible to record copy protected information. However, in the case of the DVD, it is removable with respect to the recording/reproducing apparatus.

BRIEF SUMMARY OF THE INVENTION

Accordingly, in an embodiment of this invention, it is an object to provide a recording/reproducing apparatus which can control a plurality of recording media and make a second information recording/reproducing medium (for example, DVD) removable while containing a first information recording/reproducing medium (for example, hard disk). Particularly, in this case, it is an object to provide a recording/reproducing apparatus which can make picture recording reservation and enrich information supply function to the user by utilizing information of picture recording reservation time based on the picture recording reservation and a picture recording reservation method of the recording/reproducing apparatus.

In order to attain the above objects, in a recording/reproducing apparatus which records information on a recording medium or reproduces information from the recording medium and can display the reproduced information on a monitor, there are provided means for storing picture recording reservation information, means for displaying a list of the recording reservation information on the monitor, calculation means for calculating required reservation capacity when one or a plurality of picture recording reservation items are selected from the list, and result displaying means for displaying result information indicating possible or impossible picture recording obtained from the relation between the reservation capacity and the remaining capacity of the recording medium which is a to-be-recorded object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing an example in which a picture recording reservation input screen is displayed on a display by the apparatus of this invention.

FIG. 3 is a diagram showing an example in which a picture recording reservation list screen is displayed on the display by the apparatus of this invention.

DETAILED DESCRIPTION OF THE INVENTION

There will now be described an embodiment of this invention with reference to the accompanying drawings.

Figure 1:
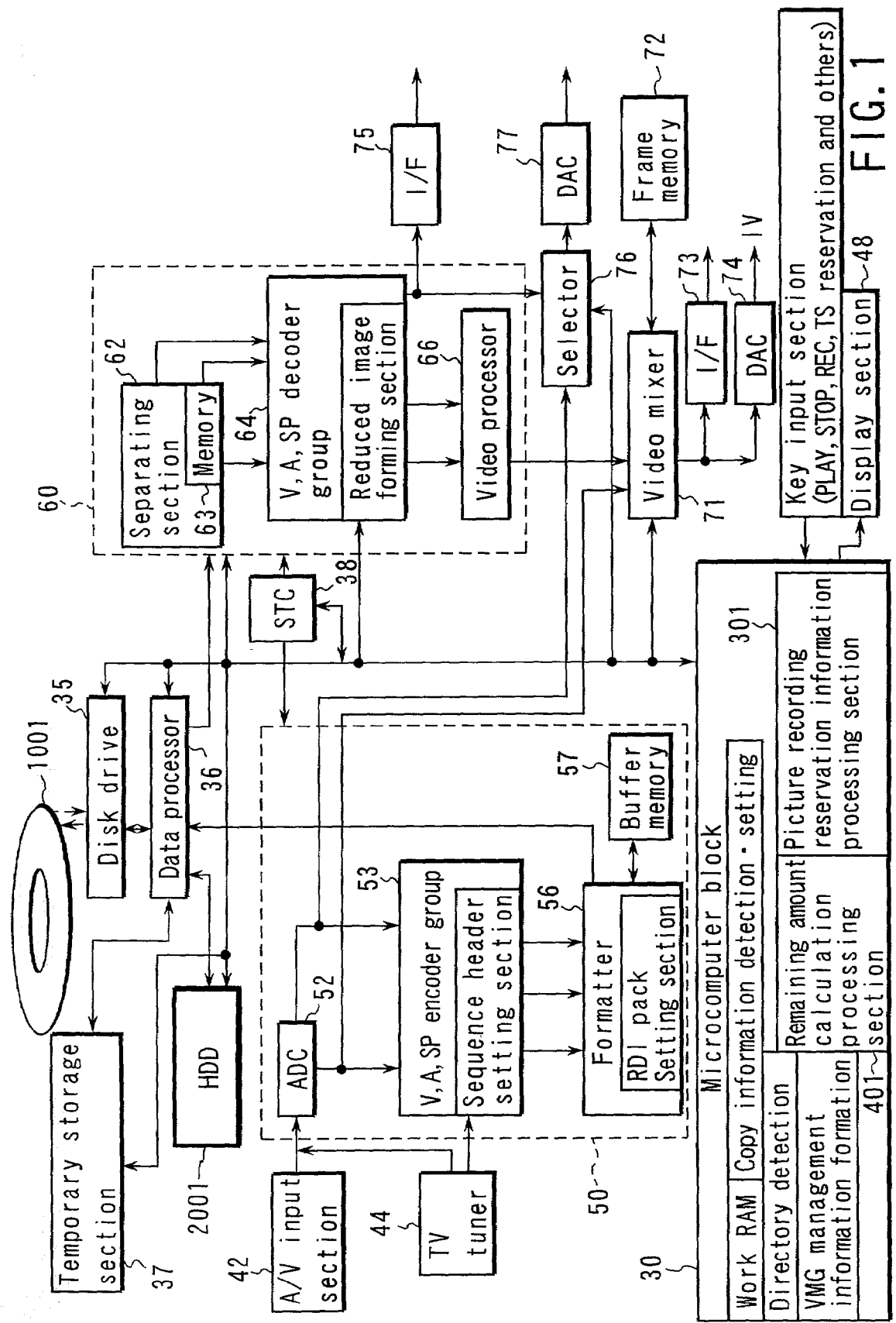
FIG. 1 is a diagram showing the whole block configuration of a recording/reproducing apparatus which can control a plurality of recording media and to which this invention is applied.

FIG. 1 shows the whole block configuration of a recording/reproducing apparatus which can control a plurality of recording media and to which this invention is applied.

When respective blocks of FIG. 1 are roughly divided, a main block of a recording section is shown on the left side of the drawing and a main block of a reproducing section is shown on the right side. The recording/reproducing apparatus includes a hard disk drive device 2001, a disk drive 35 which rotates and drives an optical disk 1001 which is an information recording medium capable of forming a video file and reads/writes information with respect to the optical disk 1001, an encoder section 50 which configures the recording side, a decoder section 60 which configures the reproducing side, and a microcomputer block 30 which controls the operation of the apparatus main body as main constituents.

The encoder section 50 has an encoder group 53 which includes an analog-to-digital converter (ADC) 52, an encoder group 53 including a video (V) encoder, audio (A) encoder and sub-video (SP) encoder, a formatter 56 which sets outputs of the respective encoders into a preset format and a buffer memory 57.

The ADC 52 is supplied with an external analog video signal and analog audio signal from an AV input section 42 or an analog television signal and analog voice signal from a television (TV) tuner 44.

The ADC 52 converts the input analog video signal into a digital form by use of a sampling frequency of 13.5 MHz, quantization bit number of 8 bits, for example. In this example, a luminance component Y, color difference component Cr (or Y-R) and color difference component Cb (or Y-B) are respectively quantized by use of 8 bits.

Likewise, the ADC 52 converts the input analog audio signal into a digital form by use of a sampling frequency of 48 kHz, quantization bit number of 16 bits, for example.

Further, when the digital video signal or digital audio signal is input to the ADC 52, the ADC 52 causes the digital video signal or digital audio signal to pass therethrough.

The digital video signal output from the ADC 52 is supplied to the formatter 56 via the video encoder. Further, the digital audio signal output from the ADC 52 is supplied to the formatter 56 via the audio encoder.

The video encoder has function of converting an input digital video signal into a digital signal which is compressed at a variable bit rate based on the MPEG2 or MPEG1 standard. Further, the audio encoder has a function of converting an input digital audio signal into a digital signal of linear PCM or a digital signal which is compressed at a fixed bit rate based on the MPEG or AC-3 standard.

If sub-video information is input (a signal of a sub-video signal from a DVD video player with an independent output terminal, for example) from the AV input section 42 to the encoder section 50, a sub-video signal (sub-video pack) is input to the sub-video encoder. Alternatively, if a DVD video signal is broadcast and received by the TV tuner 44, a sub-video signal (sub-video pack) in the DVD video signal is input to the sub-video encoder. The sub-video signal input to the sub-video encoder is arranged into a preset signal form and supplied to the formatter 56.

The formatter 56 subjects an input video signal, audio signal, sub-video signal and the like to a preset signal processing while using the buffer memory 57 as a work area. By the signal processing, recording data corresponding to the format (file structure) of the DVD standard is formed and the recording data is supplied to the data processor 36.

In this case, the present apparatus can supply information encoded in the encoder section 50 and management information formed in the computer block 30 to the hard disk device 2001 via the data processor 36 and record the same on the hard disk.

Further, information recorded on the hard disk can be recorded on the optical disk 1001 via the data processor 36, disk drive 35. Still further, information encoded in the encoder section 50 and management information formed in the computer block 30 can be recorded on the optical disk 1001 via the data processor 36, disk drive 35.

The management information is information used to reproduce contents recorded in a preset format and information indicating attribute, address, preset separation information, reproducing order based on separation information and the like.

Further, the present invention permits information of the hard disk to be recorded on the optical disk 1001 without performing the encoding process in a case where information recorded on the hard disk of the hard disk device 2001 has the same data format of the optical disk 1001.

In a case where information recorded on the hard disk of the hard disk device 2001 is different from the data format of the optical disk 1001, information read out from the hard disk is encoded in the encoder section 50. Then, the encoded information can be recorded on the optical disk 1001.

At this time, the contents of a standard encoding process of forming recording data onto the optical disk 1001 are simply explained. That is, if the encoding process is started in the encoder section 50, parameters (such as a bit rate) necessary when the encoding process for video (main video picture) data and audio data is performed are set.

Next, distribution of a coding amount optimum for a set average transfer rate (recording rate) is calculated by performing the pre-encoding process for main video data by use of the set parameter. The encoding process of the main video data is performed based on distribution of the coding amount obtained by the pre-encoding process. At this time, the encoding process of audio data is simultaneously performed. Likewise, parameters necessary for performing the encoding process for sub-video data are set and sub-video data subjected to the encoding process is formed.

The main video data, audio data and sub-video data subjected to the encoding process are combined and converted into the structure of a video object set (VOBS).

That is, a cell is set as the minimum unit to manage the main video data (video data) and cell information is formed. Next, a set of cells configuring a program chain PGC (information indicating the order of video data items to be reproduced) is made. Further, attributes and the like of the main video picture, sub-video picture and audio are set (as part of the attribute information items, information items obtained when respective data items are encoded are used). As a result, a video manager (VMG) file containing various information items is formed.

On the other hand, the main video data, audio data and sub-video data subjected to the encoding process are processed as follows. That is, the main video data, audio data and sub-video data are each subdivided into packs of constant size (2048 bytes). Dummy packs are adequately inserted into these packs. In this case, time stamps such as a PTS (presentation time stamp) indicating reproduction time and a DTS (decoding time stamp) indicating decoding time are adequately described in packs other than the dummy pack. As to the PTS of the sub-video picture, it is possible to describe time which is arbitrarily delayed with respect to the PTS of the audio data or main video data of the same reproduction time zone.

Then, in order to make it possible to reproduce each data in a time code order, each unit of video object unit (VOBU) is arranged in correspondence to each cell while arranging an RDI pack (corresponding to a navigation pack) in the head thereof. Thus, a video object (VOB) configured by a plurality of cells is configured. A video object set (VOBS) configured by collecting one or more video objects (VOB) is recorded as a movie video file.

In this case, if a DVD reproduction signal from the DVD player is copied in a digital form, it is not necessary to newly form the cell, program chain, management table, time stamp and the like since the contents thereof are determined from the beginning. However, if the DVD video recorder is so configured that the DVD reproduction signal can be copied in a digital form, it is necessary to use copy protection means using electronic watermark information or other copyright protection information.

As a portion which reads/writes (records and/or reproduces) information with respect to the optical disk 1001, the disk drive 35 having an optical system and drive system, data processor 36, temporary storage section 37 and STC (system time counter or system time clock) 38 are provided.

The temporary storage section 37 is used to buffer a constant amount of data (data output from the encoder section 50) to be written into the optical disk 1001 via the data processor 36, disk drive 35 and buffer a constant amount of data (data input to the decoder section 60) reproduced from the optical disk 1001 via the disk drive 35, data processor 36. The disk drive 35 has a rotation control system, laser drive system, optical system and the like for the optical disk.

If the optical disk 1001 is used up in the course of picture recording, the temporary storage section 37 can also be used to temporarily store recording information for a short time until the optical disk 1001 is replaced with a new disk.

However, in the present apparatus, since the hard disk device 2001 having large capacity is provided, the device can be used for temporary storage.

If a high-speed drive (higher than twice the speed) is used as the disk drive 35, the temporary storage section 37 can also be used to temporarily store data which is excessively read out than by a normal drive within a preset period of time. If readout data at the time of reproduction is buffered in the temporary storage section 37, it is possible to prevent interruption of a reproduced picture by selecting and using reproduced data buffered in the temporary storage section 37 even when an optical head which is not shown in the drawing causes a readout error due to vibration shock and the like.

The data processor 36 supplies DVD recording data output from the encoder section 50 to the disk drive 35, fetches a DVD reproduction signal reproduced from the optical disk 1001 from the disk drive 35, rewrites management information recorded on the optical disk 1001 or deletes data (file or video object) recorded on the optical disk 1001 according to control of the microcomputer block 30.

The microcomputer block 30 includes an MPU (microprocessing unit) or CPU (central processing unit), a ROM in which a control program or the like is written, and a RAM to provide a work area necessary for executing the program.

Further, the microcomputer block 30 has an information processing section necessary for controlling another processing block and includes a copy information detecting/setting section, directory detecting section, and VMG management information forming section.

Among the results of execution of the MPU, the contents to be notified to the user of the disk drive 35 are displayed on a display section 48 of the DVD video recorder or displayed on an OSD (on-screen display) by use of a monitor display.

In this case, timings at which the microcomputer block 30 controls the disk drive 36, data processor 36, encoder section 50 and/or decoder section 60 and the like can be performed based on time data from the STC 38. The recording and reproducing operations are normally performed in synchronism with a time clock from the STC 38, but the other processes may be performed at timings independent from the STC 38.

The decoder section 60 has a separator 62 which separates and fetches respective packs from video information having a pack structure, a memory 63 used at the time of execution of the pack separation and other signal processings and a decoder group 64 including a video decoder which decodes main video data (the contents of the video pack) separated by the separator 62, a sub-video decoder which decodes sub-video data (the contents of the sub-video pack) separated by the separator 62 and an audio decoder which decodes audio data (the contents of the audio pack) separated by the separator 62. Further, the decoder section 60 includes a video processor 66 which adequately combines main video data obtained from the video decoder with sub-video data obtained from the sub-video decoder and outputs the main video picture which has a menu, highlight button, caption and other sub-video pictures superposed thereon.

Output of the video processor 66 is input to a video mixer 71. In the video mixer 71, for example, text data, graphic data and the like are synthesized. Further, to the video mixer 71, a line which directly fetches a signal from the TV tuner 44 or AV input section 42 is connected. To the video mixer 71, a frame memory 72 used as a buffer is connected. When digital output is obtained, the output of the video mixer 71 is output to the exterior via an interface (I/F) 73, and when analog output is obtained, the output of the video mixer 71 is output to the exterior via a DAC 74.

When a digital output is obtained as the output of the audio decoder, the output of the audio decoder is output to the exterior via an interface (I/F) 75, and when analog output is obtained, the output of the audio decoder is output to the exterior via a selector 76, DAC 77. The selector 76 can also select an output from the ADC 52 when a signal from the TV tuner 44 or A/V input section 42 is directly monitored according to a select signal from the microcomputer block 30. An analog audio signal is supplied to an external component (multi-channel stereo device of two to six channels) which is not shown in the drawing.

In the above apparatus, if the flow of a video signal is briefly explained, it becomes as follows.

An input AV signal is digitized by the ADC 52. The video signal is input to the video encoder, the audio signal is input to the audio encoder, and character data such as a character broadcast is input to the sub-video encoder. The video signal is MPEG-compressed, the audio signal is AC3-compressed or MPEG-audio-compressed and the character data is run-length-compressed.

Compressed data from each encoder is formed into a packet form so that it will have 2048 bytes when separated and is input to the formatter 56. In the formatter 56, each packet is formed into a pack form, then multiplexed and supplied to the data processor 36.

In this case, the formatter 56 forms an RDI pack based on information from an aspect information detecting section 43 and arrange it in the head of the video object unit (VOBU). Further, other attribute information items (such as copy protection information) are arranged in the RDI pack.

The data processor 36 adds error correction data for every 16 data sectors to form an ECC block and supplies an output thereof to the disk drive 35. In the disk drive 35, the ECC block is further subjected to a modulation process, a synchronization code or the like is added thereto and recorded on the optical disk 1001. In one data sector, data of 2048 bytes (one pack) is contained.

In this case, if the disk drive 35 is set in a busy state due to the case of a seeking operation or tack jump process, it is inserted into the temporary storage section 37 (for example, HDD buffer section) and it waits until preparation of the DVD-RAM drive section (disk drive 35) is made.

Further, in the formatter 56, each separation information is formed during recording and periodically supplied to the MPU of the microcomputer block 30 (information at the time of GOP head interruption, for example).

As the separation information, the number of packs of the VOBU, the end address of an I picture from the VOBU head, the reproduction time of the VOBU or the like is provided.

At the same time, information from the aspect information detecting section 43 is supplied to the MPU at the time of start of recording and the MPU forms VOB stream information (STI). In this case, STI stores resolution data, aspect data and the like and each decoder section is initialized based on the information at the time of reproduction.

Further, in a recordable/reproducible DVD system, a video file is so set that one file may be on one disk.

In this case, in a real-time recording/reproducing apparatus using a DVD, a point to be noted is that successive sectors of the minimum number are required to continue reproduction without interruption while access (seek) is being made in a case where data is accessed. The unit is called a CDA (contiguous data area).

The CDA is more advantageous if it is set in an ECC block unit. Therefore, the CDA size is set to a multiple of 16 sectors and recording is performed in the CDA unit in a file system. However, in this case, for example, if an available area of the size of the CDA is not successfully provided, a short sector used by another file is permitted to be inserted into the CDA. As a result, recording can be performed in the CDA unit.

The apparatus of the present invention has time slip (TS) function.

Therefore, the hard disk device 2001 can be effectively used. That is, information which is from the AV input section or TV tuner and is on the air is recorded on the hard disk by the hard disk device 2001. While the recording is being continued, recorded information can be read out, decoded and monitored. Alternatively, information read out from the hard disk can be recorded on the optical disk 1001. Further, information which is now monitored can be recorded on the hard disk at the same time that the recorded information is decoded and monitored. The recording, reproducing processes for the hard disk, optical disk are performed in a time sharing fashion.

The hard disk device 2001 is contained in the apparatus and the optical disk 1001 is removable and can be freely exchanged by the user.

In the present apparatus, a picture recording reservation information processing section 301 is set in the microcomputer block 30. Further, a remaining amount calculation processing section 401 is set.

The picture recording reservation information processing section 301 can display a picture recording reservation input screen 310 as shown in FIG. 2 and a picture recording reservation list screen 350 as shown in FIG. 3, for example, by the picture recording reservation key operation of the user.

FIG. 2 shows the picture recording reservation input screen 310. From the right side on the uppermost row, items of a channel (CH), date, start, end, recording destination, mode, bit rate, tone quality, time slip (TS) are provided.

The first reservation information indicates that a program which is reserved to be recorded will be broadcasted on satellite broadcast channel 15 (BS15), the date is April 15, and the program is from 07:30 p.m. to 08:00 p.m. Further, it is indicated that the recording destination of the program is a DVD, the recording mode (speed) is manual, and the bit rate is 6.0. Also, it is indicated that the Dolby system (DB-S) is used for the tone quality. In addition, it is indicated that the picture recording is performed in a time slip mode.

Further, the second reservation information indicates that a program which is reserved to be recorded will be broadcast on channel 12, the date is April 14, and the program is from 07:30 p.m. to 10:00 p.m. Further, it is indicated that the recording destination of the program is an HDD, the recording mode (speed) is SP (standard), and the bit rate is 5.0 Mbps. Also, it is indicated that the Dolby system (DB-S) is used for the tone quality. In addition, it is indicated that the picture recording is performed in a time slip mode.

The example in the drawing shows a state in which a reservation information input position (row) is set by moving a cursor 311 on the left side.

After the above picture recording reservation is made, the picture recording reservation list screen 350 of FIG. 3 can be displayed. This can be attained by, for example, operating a next-page operation or enter key in the state of the reservation input screen 310 of FIG. 2.

The screen of FIG. 3 is the same as the screen of FIG. 2, but an item 351 which sets a reservation disk is further displayed. For example, if it is desired to record the same programs (programs of, for example, successive dramas which will be broadcast on different dates and make a series) on one disk, the reservation disk is to specify the disk as a reservation disk. If the reservation disk is set, the picture recording reservation information is stored in a reservation information recording section in which the reservation disk is previously set and in the memory of the apparatus main body.

In this case, the state in which a DVD is specified as a reservation disk which records successive programs of channel 6 from 8:30 a.m. to 10:00 a.m. is shown.

Figure 4:
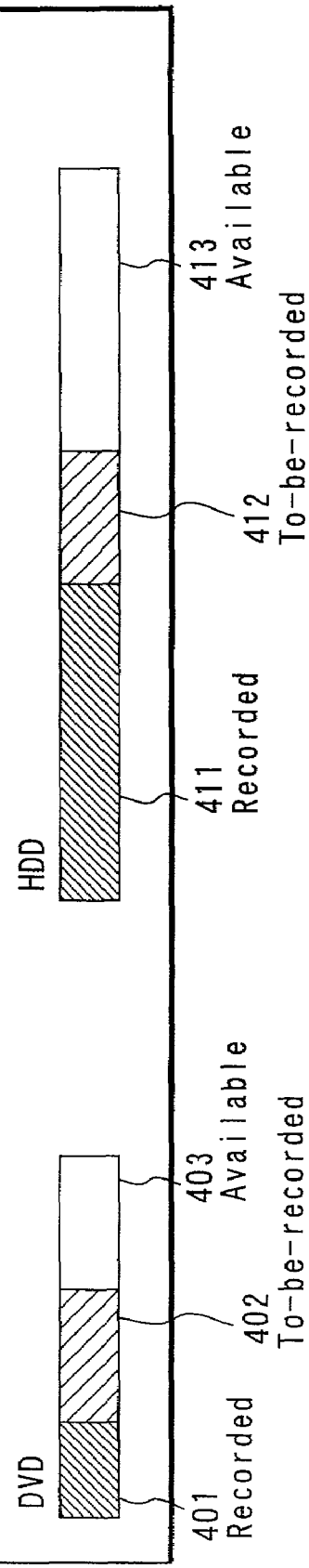
FIG. 4 is a diagram showing an example in which a remaining amount calculation result screen is displayed on the display by the apparatus of this invention.

Next, an explanation is made with reference to FIG. 4.

In the system of the present invention, there is provided a simulation system which calculates the remaining amount of a disk which is reserved to be recorded and checks whether or not the reservation recording can be made possible according to the recording time. The screen of FIG. 4 is displayed by, for example, operating a next-page operating operation or GUI (graphic user interface) key in the display state of the screen of FIG. 3.

In this case, the picture recoding reservation of a program of BS channel 15 which is a satellite broadcasting from 7:30 p.m. to 8:00 p.m., the picture recoding reservation of a program of channel 8 from 8:00 a.m. to 9:00 a.m., the picture recoding reservation of a program of channel 6 from 8:00 p.m. to 10:00 p.m. are made for the DVD.

Further, it is assumed that reservations of a program of channel 12 from 7:00 p.m. to 10:00 p.m., a program of channel 3 from 1:00 p.m. to 4:00 p.m. a program of channel 4 from 10:00 p.m. to 12:00 p.m. and a program of channel 10 from 10:00 a.m. to 1:00 p.m. are made for the hard disk (HDD).

For example, if the user wants to confirm whether each of the reserved programs of BS channel 15, channel 12, channel 8, channel 6, or channel 3 can be recorded or not on the above screen, the following operation is performed.

That is, a "✓" mark is attached to each row of the reserved channel, date, time, recording destination. Then, comparisons between time information items of the picture recording reservation and the available capacities of the respective disks are made and the results are displayed in the form of o, x, for example. In this case, the results are preferentially dealt with as the dates and time information items are earlier.

In the example of FIG. 4, is attached to the reservation for the program of BS channel 15, o is attached to the reservation for the program of channel 12, is attached to the reservation for the program of channel 8, x is attached to the reservation for the program of channel 6, o is attached to the reservation for the program of channel 3.

The reason why x is obtained as the reservation for the program of channel 6 is the reason that the remaining amount of the disk (DVD) has become insufficient.

Further, on the remaining amount calculation screen, for example, distribution of a display segment 401 of recoded capacity of the HDD, a display segment 402 of to-be-recoded capacity, a display segment 404 of available capacity, distribution of a display segment 411 of recoded capacity of the DVD, a display segment 412 of to-be-recoded capacity, an available capacity display segment 413 are bar-displayed. Thus, the user can easily confirm the reliability of the picture recording reservation. Identification of the capacity segments may be based on a pattern or different colors. Further, it is of course possible to attach characters of recorded, to-be-recorded, available and the like.

Figure 5:
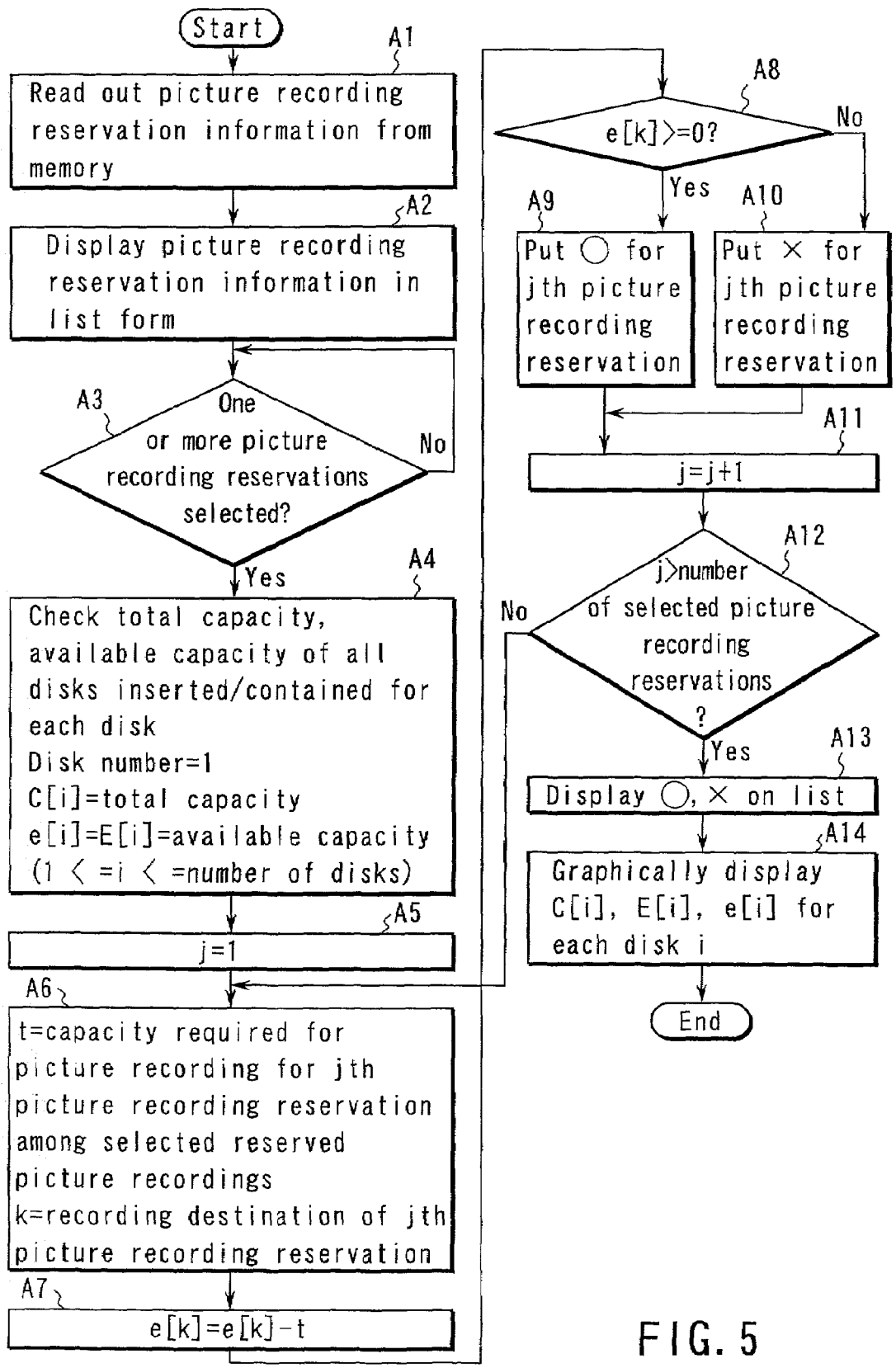
FIG. 5 is a flowchart showing a procedure of a remaining amount calculation process according to this invention.

In FIG. 5, a procedure in which the apparatus of the present invention is operated when the above-described remaining amount calculation result is obtained is shown.

Picture recording reservation information is read out from a memory (which is contained in or attached to the exterior of the microcomputer block, for example) (step A1). Next, picture recording reservation information as shown in FIG. 4 is displayed in a list form (step A2). Next, a row which confirms whether the picture recording can be made or not is checked by the user's operation and a "✓" mark is attached (step A3). Then, the total capacity C(i) of a disk inserted into the apparatus and a disk contained therein and available capacity {e(i)-E(i)} are checked (step A4).

(i is the number of disks and i=1, 2 in this case).

Next, capacities required for picture recording as to the respective reservations are calculated (steps A5, A6).

Then, available capacities of the respective disks are also calculated (step A7). If the available capacity is positive, o is attached to the reservation item, and if the available capacity is negative, x is attached to the reservation item (steps A8, A9, A10).

The above process is performed for each of the specified reservation items (steps A11, A12). When o or x is determined for all of the specified reservation items, the information items (results) are displayed on a list table (step A13). Further, distributions of the recorded, to-be-recorded reservation, available capacities for the respective disks (DVD1. HDD) are graphically displayed (step A14).

Information to calculate the available capacity, used-up capacity, to-be-recorded capacity of the disk can be acquired from management information of data reproduction, for example.

If a display is obtained as shown in FIG. 4 as the result of the above calculation, the user can recognize that the reservation recording for the program of channel 6 cannot be made.

In this case, the user can substitute a DVD of large available capacity, perform the above process again and confirm whether the reserved program can be recorded or not. Further, if it is desired to record the checked reserved program for the present DVD, the following operation can also be performed.

For example, the contents described in the column of the mode of FIG. 4 indicate that the bit rate when data is recorded is specified by any one of manual, SP, LP. In this case, if the user makes mode selection and moves the cursor to a desired row, the mode can be changed. That is, the user can set the bit rate when the reserved program is recorded to any one of manual, SP, LP by selecting any one of manual, SP, LP.

Figure 6:
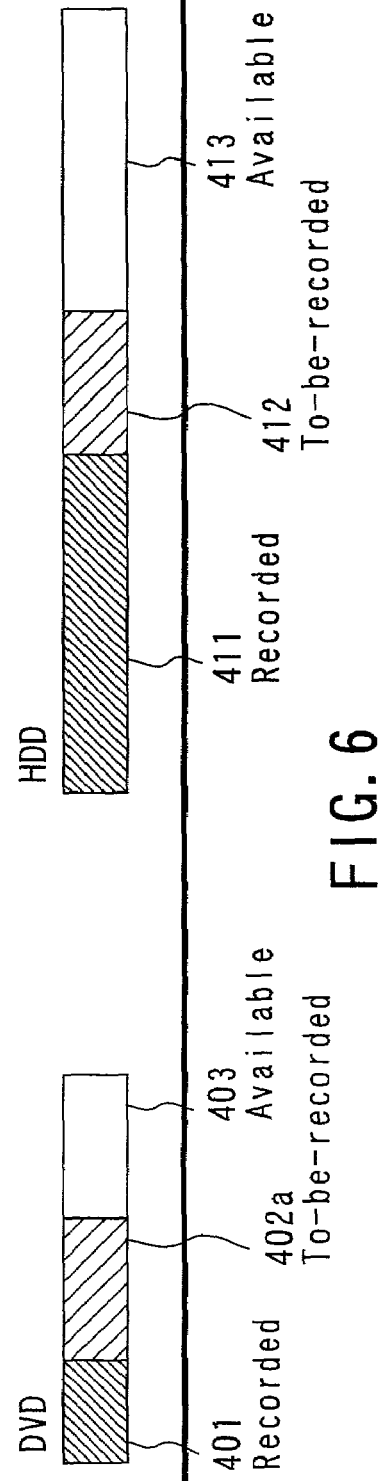
FIG. 6 is a diagram showing an example in which a remaining amount calculation result screen is redisplayed on the display by the apparatus of this invention.

An example in which specification of changeover of the mode item is made on the screen of FIG. 4 and then specification is made to record in the LP mode for the program of channel 6 is shown FIG. 6. If a change is thus made to the LP mode, the bit rate is changed to 2.4. Therefore, a to-be-recorded area for the DVD can be made smaller in comparison with a case of the SP mode shown in FIG. 4. Accordingly, this case is an example in which the item of the remaining amount display result is changed to a display of o.

The apparatus is not limited to the above embodiment. The explanation of FIG. 6 showed the example in which the SP mode is changed to the LP mode. However, this is not limitative and it can be set to the manual mode. In the apparatus, if the manual mode is set, the bit rate can be finely adjusted.

Further, in the above explanation, o, x are indicated as a form of display of the remaining amount calculation result, but the above display form is not limitative, YES, NO can be used and a display of OK, NG may be made.

Figure 7:
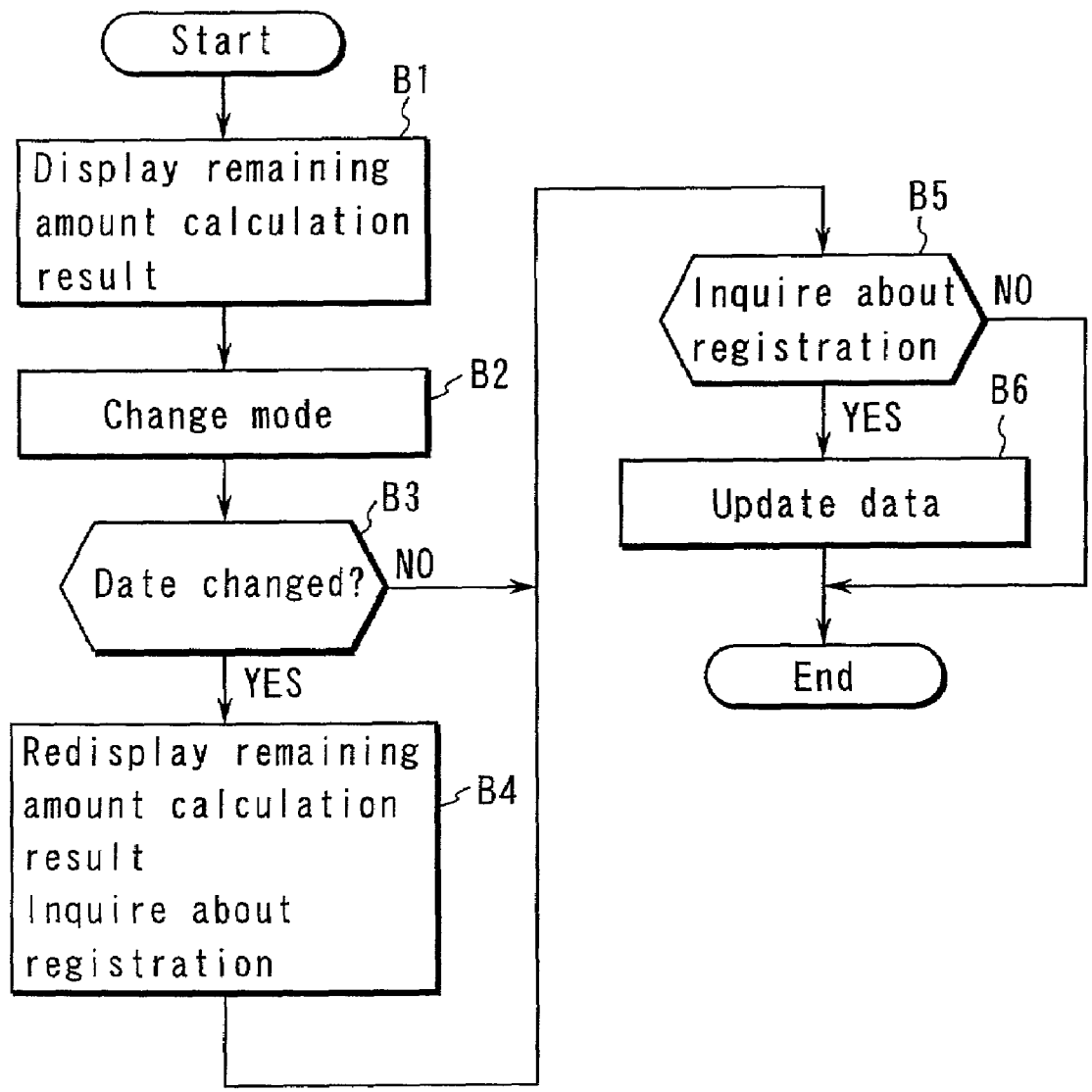
FIG. 7 is a flowchart showing a processing procedure when the remaining amount calculation result screen relating to this invention is displayed.

In FIG. 7, the processing procedure in the microcomputer block 30 in a case where the picture recording mode is changed as described above is shown.

In the display (step B1) state of the remaining amount calculation result, if a mode changing operation (step B2) is performed, whether a change of data is made or not is determined (step B32). If a data change is made, a redisplay of the remaining amount calculation result is made (step B4). Then, an inquiry as to whether the reserved recording is made based on the display contents or not is made (step B5). In this case, if the user intends to make the reserved recording based on the updated display contents, the user performs the operation of "setting registration". As a result, the data contents are updated to new reservation information (step B6). If the operation of "no setting" or "no registration" is performed in the step B5, the reservation information of the contents shown in FIG. 4 is maintained without updating the data contents.

Further, the system of the present invention has function of checking whether or not a removable disk, that is, a DVD is loaded in the apparatus when the remaining amount calculation is made by use of the above picture recording reservation information.

Figure 8:
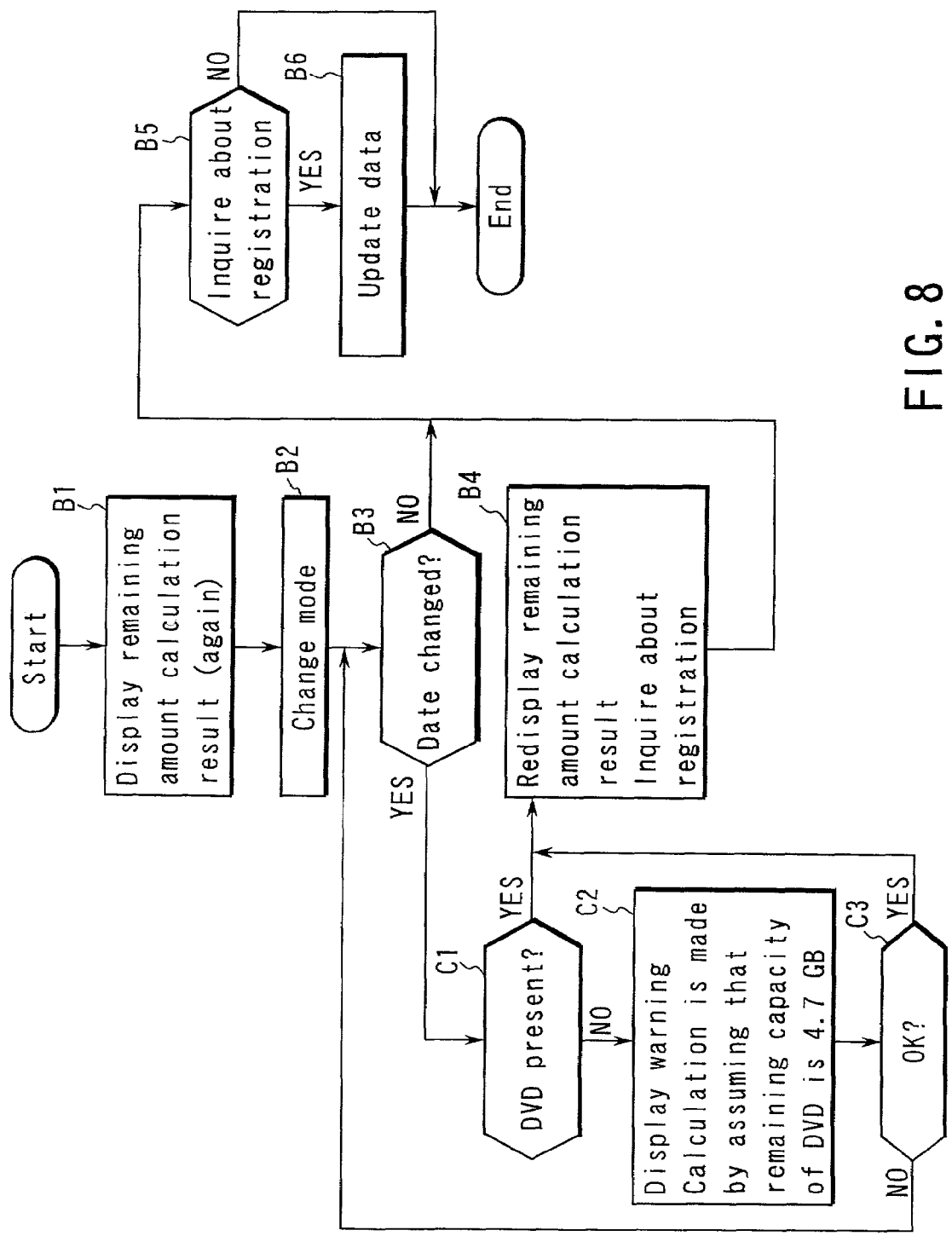
FIG. 8 is a flowchart showing still another processing procedure when the remaining amount calculation result screen relating to this invention is displayed.

In FIG. 8, an example in which function of previously checking whether or not a DVD-RAM is loaded in the apparatus when the remaining amount is recalculated is added is shown. The same symbols are attached to the same portions as in the processing steps shown in FIG. 7.

That is, after it is determined in the step B3 that the mode change is made, whether the DVD-RAM is loaded in the apparatus or not is checked (step C2). If the DVD-RAM is not present, a warning display is made and a display indicating that the remaining amount recalculation is made by assuming that the DVD-RAM is fully available (4.7 GB) is made (step C2). In this case, if the user gives operation input of acceptance (OK) (step C3), the remaining amount recalculation including the reservation recording is made and the step B4 is performed. However, if the user performs the operation to the effect that he denies in this case step (step C3), return is made to the step B3. Therefore, for example, the user can load a desired DVD on the apparatus while warning is being given.

The directory and management information of the DVD system are explained below.

Figure 9:
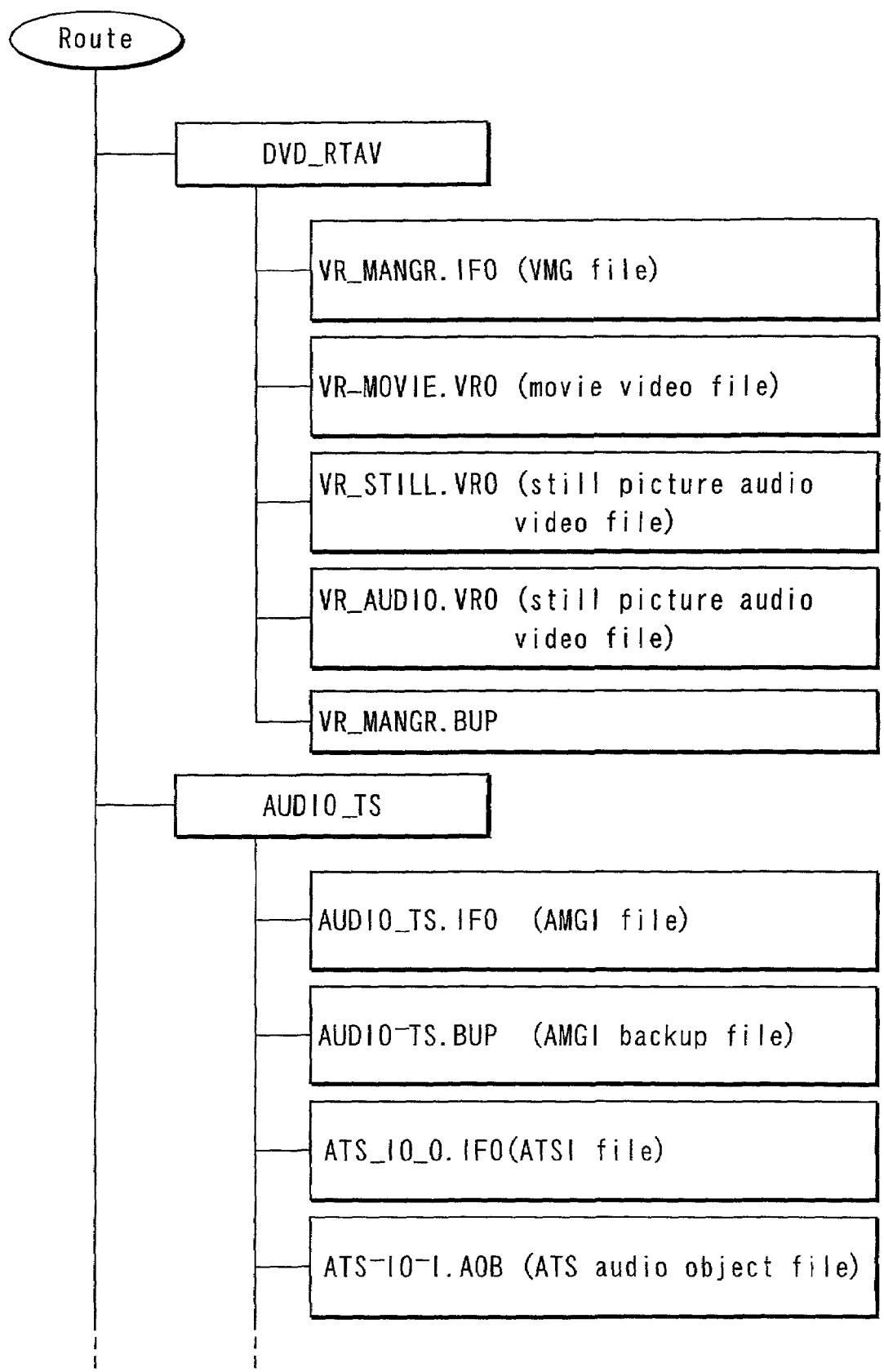
FIG. 9 is a diagram for illustrating the directory structure of a recording/reproducing DVD.

FIG. 9 shows part of the directory structure of the DVD system. It shows the directory structure of an audio file and the directory structure of, particularly, a real-time recording (RTR) DVD of the DVD system.

In the DVD, the directory exists for each standard, and the directory names are indicated as "VIDEO_TS" in the DVD-video, "AOUDIO_TS" in the DVD-audio, "DVD_RTR" in the RTR-DVD. In FIG. 6, "DVD_RTR", "AOUDIO_TS" are shown. Recording data exists in each directory.

Further, in the DVD, data is stored in a normal file form. A title corresponds to one movie, for example, and a plurality of the titles of one disk can be recorded. Then, a set of titles is called a title set and the title set is configured by a plurality of files.

In the above DVD-video, information to manage information of one disk is recorded on the disk. The management information is recorded as a file and is called a video manager (VMG).

In the directory "DVD_RTAV", respective files of VR_MANGR.IFO as a video manager (VMG) file, VR_MOVIRE.VRO as a movie video file, VR_STILL.VRO as a still picture video file, VR_AUDIO.VRO as a still picture video file, VR_MANAGR.BUP as backup of a video manager are present.

Further, in the directory "AUDIO_TS", AUDIO_TS.IFO as an audio manager information (AMGI) file, AUDIO_TS.BUP as an audio manager information (AMGI) backup file, ATS_01_0.IFO as an audio title set information (ATSI) file, ATS_01_0.AOB as an audio title set (ATS) audio object file exist.

In the VR_MANGR.IFO file, navigation data is recorded and the navigation data is data which causes a program set, program, entry point, play list and the like to proceed.

The VR_MOVIRE.VRO file is a so-called movie AV file to record a movie video object (movie VOB).

The VR_STILL.VRO is a still picture AV file to record a still picture VOB.

Further, the VR_AUDIO.VRO is a still picture adding audio file to record an adding audio stream with respect to a still picture.

The VR_STILL.VRO is used to record an original VOB configured by a video part containing a given sub-picture unit. Further, at this time, an audio part associated with the video part is also contained in the original VOB.

The VR_AUDIO.VRO is a file used to record an adding audio part and the adding audio part indicates an audio stream recorded by after-recording. The audio part recorded in the VR_AUDIO.VRO is used in combination with some video parts recorded in the VR_STILL.VRO.

The VR_MANGR.BUP is a backup file of the VR_MANGR.IFO.

Figure 10:
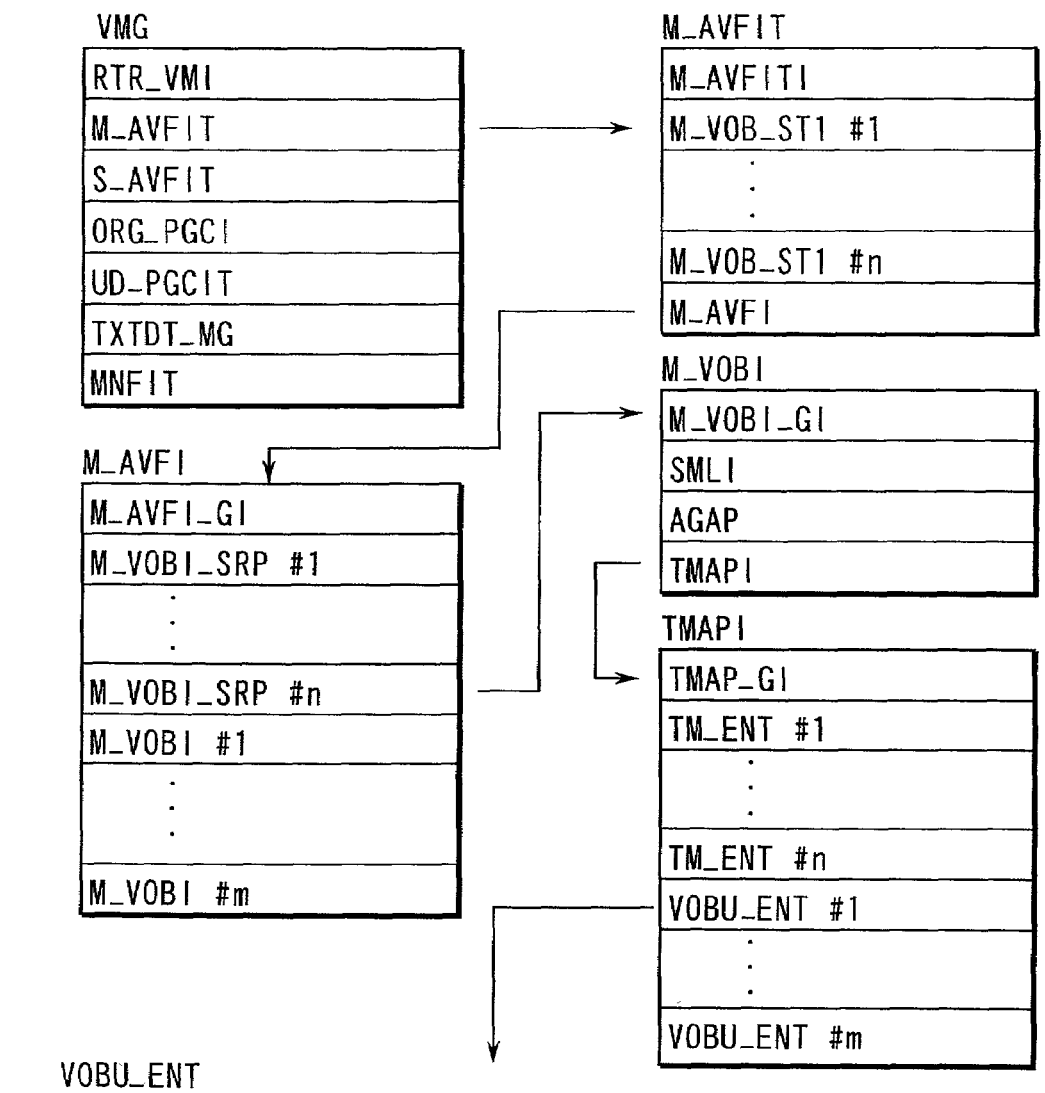
FIG. 10 is a diagram showing part of a format of management information of the recording/reproducing DVD.

In FIG. 10, information described in the VMG file is shown in a hierarchical form, and particularly, a movie AV information table (M_AVFIT) is specifically shown in a hierarchical form.

In the M_AVFIT, movie AV information table information (M_AVFITI), movie VOB stream information (M_VOB_STI#n) (n=1 to n), movie AV file information (M_AVFI) are described.

The movie AV file information (M_AVFI) is explained.

In the movie AV file information (M_AVFI), M_AVFI general information (M_AVFI_GI), M_VOB information search pointer (M_VOBI_SPR#n), movie video information (M_VOBI#n) are described.

In the M_AVFI general information, the number of M_VOB search pointers, the start address of the M_VOB information are described.

In the M_VOB information #n, general information (M_VOB_GI) of the M_VOB, seamless information (SMLI), audio gap information (AGAPI), time map information (TMAPI) are described.

In the M_VOB_GI, a VOB type indicating whether the VOB is set in a normal state or in a temporarily erased state and an audio status indicating whether the audio stream has been recorded as an original or partially or entirely corrected when the VOB was formed are described.

Further, in the M_VOB_GI, the recording time of the VOB and time of minutes as a sub are recorded. Still further, in the M_VOB_GI, the stream information number of the M_VOB, video start time and end time of the VOB, copy protection information are described.

Next, the movie video information (M_VOBI#n) is explained. The M_VOBI#n is specified by M_VOBI_SRP#n.

In the movie video information (M_VOBI#n), a VOB type indicating whether the VOB is set in a normal state or in a temporarily erased state and an audio status indicating whether the audio stream has been recorded as an original or partially or entirely corrected when the VOB was formed are described.

Next, the time map information (TMAPI) is explained.

The TMAPI is used to convert presentation time to an offset address. The information is prepared to be used for not only normal reproduction but also special reproduction and time search.

The TMAPI is configured by time map general information (TMAP_GI), time map entry table (TM_ENT#1 to #n), video object entry table (VOBU_ENT#1 to #n) corresponding to the entry information.

Each TM_ENT contains address information of a corresponding VOBU and contains time difference information between reproduction time specified by time entry and the reproduction start time of the VOBU.

Each VOBU_ENT contains reproduction time and size information of each VOBU. The size of the VOBU is measured by a logical block and the reproduction time is measured by a video field.

The TMAP_GI includes the number of time entires (TM_ENT_Ns), the number of VOBU enties (VOBU_ENT_Ns), time offset (TM_OFS), address offset (ADR_OFS).

The VOBU_ENT is explained.

The VOBU_ENT is configured by (1STREF_SZ) in which an address of a first reference picture of the VOBU is described, (VOBU_PB_TM) in which the reproduction time of the VOBU is described, and (VOBU_SZ) in which the size of the VOBU is described. The first reference picture is an end address of an I picture from the head of the VOBU and an address of data which is first required for decoding video in the VOBU. The reproduction time of the VOBU is indicated by the number of video fields in the VOBU. Further, the size of the VOBU is indicated by the number of packs in the VOBU.

The RTR_VMI is explained.

The RTR_VMI is roughly divided into two information items. One is VMGI_MAT (video manager information management table) and the other one is PL_SRPT (play list search pointer table).

In the VMGI_MAT, a VMGI identifier to identify the VMG, an RTR_VMG end address which is information indicating the end position of the VMG, an RTR_VMGI end address which is information indicating the end position of the VMG information, the version number of the book, a time zone which is information indicating time at which various data is recorded or updated on the disk, still time for a still picture, a character set code for a primary text, resume mark information in which information (such as a program chain number) required for performing next reproduction after temporary interruption during reproduction of the disk is described, disk representative picture information in which information required for reproducing a disk representative picture is described, a disk representative name which is descriptive information by a character code set which displays a representative name of the disk are described. Further, a next stored start address of M_AVFT, start address of S_AVFIT, start address of ORG_PGCI, start address of UD_PGCI, start address of TXTDT_MG, start address of MNFIT are described.

In the PL_SRPT, the number of play list search pointers and the search pointer of each play list are described. The play list is a list indicating each portion of a program, the reproduction order can be specified by the user, and it is defined by the user definition PGC which will be described later. In the play list search pointer, various information items of time when the play list was formed, a play list type to identify whether a to-be-reproduced object is a movie or still, a program chain number corresponding to the pointer, primary text information for the play list and the like are contained.

As described above, in the management information, reproduction time information of recorded data and the like are described. The recorded capacity can be known by summing up entire times of the video object. Further, the total capacity of the disk at the time of no recording is previously known. Therefore, the remaining capacity can be known by subtracting the recorded capacity from the total capacity.

Further, the to-be-recorded capacity can be estimated from picture recording reservation time information and bit rate. Accordingly, the available capacity can be derived by subtracting the to-be-recorded capacity from the remaining capacity.

This invention is not limited to the above embodiment.

In the above explanation, it is assumed that the reservation picture recoding information is stored in the memory. However, this is not limitative and it may be recorded in a contained hard disk.

Further, in the above explanation, an example in which whether or not the reservation picture recoding is possible is calculated for the hard disk contained in the apparatus and one DVD is shown.

However, it is also possible to know whether or not the reservation picture recoding is possible for a DVD which is removed from the apparatus. In this case, it is necessary to make calculation for the remaining capacity after picture recording is made on the DVD and store remaining capacity information in a memory. Further, it is necessary to store DVD identification information together with the remaining capacity as a table in a memory.

Thus, the remaining amount calculation result can be displayed by storing the remaining capacity information of the DVD which is removed from the apparatus main body as a library in a memory or hard disk. However, in this case, whether it is a disk mounted on the apparatus main body or a disk removed from the apparatus main body is additionally displayed by use of a color or character (or symbol). Further, in this case, a bar graph which displays distribution of recorded, available area, to-be-recorded for a DVD may display them for a plurality of DVD1, DVD2, DVD3, for example.

As described above, according to this invention, when picture recording reservation is made, the remaining capacity of a recording medium is calculated so as to permit the user to easily understand the reservation status and whether the reservation recording is possible or not. Further, it is possible to change reservation information.

This invention is applied to a recording/reproducing apparatus capable of controlling a plurality of recording media which can simultaneously deal with a plurality of recordable/reproducible media such as hard disks and recordable/reproducible DVDs (digital versatile disks) and is effective.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. In a recording/reproducing apparatus which records information on a first recording medium contained in the apparatus or reproduces information from the first recording medium or records information on a second recording medium which is removably attachable to the apparatus or reproduces information from the second recording medium and can display the reproduced information on a monitor, the recording/reproducing apparatus comprising:

means for storing picture recording reservation information, means for displaying a list of the reservation information on the monitor, calculation means for calculating required reservation capacity when one or a plurality of picture recording reservation items are selected from the list, result displaying means for displaying result information which indicates possible or impossible picture recording and is obtained from the relation between the reservation capacity and the remaining capacity of the recording medium which is a to-be-recorded object on the monitor, result redisplaying means for redisplaying result information which indicates possible or impossible picture recording on the monitor after the picture recording reservation item has been corrected according to operation input in a state in which said result displaying means displayed the result information on the monitor, and inquiry displaying means for displaying an inquiry as to whether or not the contents of respective display items displayed on the monitor by said result redisplaying means are set and registered on the monitor.

2. In a recording/reproducing apparatus which records information on a first recording medium contained in the apparatus or reproduces information from the first recording medium or records information on a second recording medium which is removably attachable to the apparatus or reproduces information from the second recording medium and can display the reproduced information on a monitor, the recording/reproducing apparatus comprising:

means for storing picture recording reservation information, means for displaying a list of the reservation information on the monitor, calculation means for calculating required reservation capacity when one or a plurality of picture recording reservation items are selected from the list, result displaying means for displaying result information which indicates possible or impossible picture recording and is obtained from the relation between the reservation capacity and the remaining capacity of the recording medium which is a to-be-recorded object on the monitor, warning means for determining whether or not the second recording medium is loaded in the apparatus after the picture recording reservation item has been corrected according to operation input in a state in which said result displaying means displayed the result information on the monitor and displaying a warning message to the effect that the remaining capacity calculation is made by assuming that the whole capacity of the second recording medium is preset capacity on the monitor when it is not loaded, result redisplaying means for redisplaying result information which indicates possible or impossible picture recording on the monitor in a case where it is permitted to make the remaining capacity calculation by assuming that the whole capacity of the second recording medium is preset capacity in a state in which the warning message is displayed by said warning means, and inquiry displaying means for displaying an inquiry as to whether or not the contents of respective display items displayed on the monitor by said result redisplaying means are set and registered on the monitor.

3. The recording/reproducing apparatus capable of controlling a plurality of recording media according to claim 1 or 2, comprising means for causing said storing means to store picture recoding reservation information with the contents displayed by said result redisplaying means if operation input for selecting setting and registration is made in a state in which said inquiry displaying means makes a display.

4. The recording/reproducing apparatus capable of controlling a plurality of recording media according to claim 1 or 2, comprising means for causing said storing means to store picture recoding reservation information with the original contents displayed by said result displaying means if operation input for denying setting and registration is made in a state in which said inquiry displaying means makes a display.

5. In a recording/reproducing apparatus which records information on a first recording medium contained in the apparatus or reproduces information from the first recording medium or records information on a second recording medium which is removably attachable to the apparatus or reproduces information from the second recording medium and can display the reproduced information on a monitor, a picture recording reservation method of the recording/reproducing apparatus comprising:

storing picture recording reservation information, displaying a list of the reservation information on the monitor, calculating required reservation capacity when one or a plurality of picture recording reservation items are selected from the list, displaying result information which indicates possible or impossible picture recording and is obtained from the relation between the reservation capacity and the remaining capacity of the recording medium which is a to-be-recorded object on the monitor, redisplaying result information which indicates possible or impossible picture recording on the monitor after a picture recoding reservation item has been corrected according to operation input in a state in which the result information was displayed on the monitor, and inquiry displaying means for displaying an inquiry as to whether or not the contents of respective display items redisplayed on the monitor are set and registered on the monitor.

6. In a picture recording reservation method of a recording/reproducing apparatus which records information on a first recording medium contained in the apparatus or reproduces information from the first recording medium or records information on a second recording medium which is removably attachable to the apparatus or reproduces information from the second recording medium and can display the reproduced information on a monitor, the picture recording reservation method of the recording/reproducing apparatus comprising:

storing picture recording reservation information, displaying a list of the reservation information on the monitor, calculating required reservation capacity when one or a plurality of picture recording reservation items are selected from the list, displaying result information which indicates possible or impossible picture recording and is obtained from the relation between the reservation capacity and the remaining capacity of the recording medium which is a to-be-recorded object on the monitor, determining whether or not the second recording medium is loaded in the apparatus after the picture recording reservation item has been corrected according to operation input in a state in which the result information was displayed on the monitor and displaying a warming message indicating that the remaining capacity calculation is made by assuming that the whole capacity of the second recording medium is preset capacity on the monitor when it is not loaded, redisplaying result information which indicates possible or impossible picture recording on the monitor in a case where it is permitted to make the remaining capacity calculation by assuming that the whole capacity of the second recording medium is preset capacity in a state in which the warning message is displayed, and inquiry displaying an inquiry as to whether or not the contents of respective display items displayed on the monitor by the result redisplaying are set and registered on the monitor.

* * * * *

UNITED STATES PATENT AND TRADEMARK OFFICE
CERTIFICATE OF CORRECTION

PATENT NO. : 7,212,725 B2 Page 1 of 1
APPLICATION NO. : 10/155231
DATED : May 1, 2007
INVENTOR(S) : Gunji et al.

It is certified that error appears in the above-identified patent and that said Letters Patent is hereby corrected as shown below:

On the Title Page, item (30), should read,

-- Foreign Application Priority Data—JP 2000-301072 September 29, 2000--

Signed and Sealed this

Seventh Day of August, 2007

JON W. DUDAS
*Director of the United States Patent and Trademark Office*